United States Patent [19]
Nordstrom

[11] Patent Number: 5,370,342
[45] Date of Patent: Dec. 6, 1994

[54] RETRACTABLE CENTERLINE GUIDE AND VERTICAL RESTRAINT DEVICE

[76] Inventor: Arnold Nordstrom, P.O. Box 390655, Anza, Calif. 92539

[21] Appl. No.: 6,572

[22] Filed: Jan. 21, 1993

[51] Int. Cl.⁵ .............................................. B64C 1/22
[52] U.S. Cl. ................................ 244/118.1; 414/536; 410/92; 410/95; 193/35 C; 193/35 SS; 244/137.1
[58] Field of Search ............... 244/118.1, 137.1, 137.3; 198/782, 785, 836.3, 836.4; 193/35 SS, 35 C; 414/531–536; 410/52, 69, 70, 77, 78, 79, 81, 86–90, 92, 94, 95, 107, 111

[56] References Cited

U.S. PATENT DOCUMENTS

| | | | |
|---|---|---|---|
| 3,381,921 | 5/1968 | McDonough et al. | 414/536 |
| 3,741,504 | 6/1973 | Alberti et al. | 414/536 |
| 4,000,870 | 1/1977 | Davies | 414/536 |
| 4,077,590 | 3/1976 | Shorey | 414/532 |
| 4,416,579 | 11/1983 | Alberti | 414/534 |

*Primary Examiner*—Galen L. Barefoot
*Attorney, Agent, or Firm*—Calif Tervo

[57] ABSTRACT

A self-erecting guide for centering and for vertically restraining smaller than full width pallets in a transport vehicle, such as an airplane, having a floor structure and rollers connected to the floor structure and defining a roller plane for rollingly supporting pallets above the floor structure such that the pallets may roll longitudinally includes a plurality of rollers such that pallets contacting the guide contact a rotatable surface resulting in less galling and wear to guide and pallets. The guide generally includes a hinge assembly, fore and aft pivots, a frame, and erection springs. In an erect position, the hinge assembly forms a shallow inverted V in side view with hinge axis at the apex such that a moving full size pallet contacting hinge assembly top forces the hinge assembly into a retracted position below the roller plane. The hinge assembly includes: overhanging rollers for vertically restraining half size pallets; side rollers for guidance; and retraction rollers on top for rolling under a full width pallet such that the hinge assembly is forced to a retracted position below the roller plane.

18 Claims, 2 Drawing Sheets

RETRACTABLE CENTERLINE GUIDE AND VERTICAL RESTRAINT DEVICE

BACKGROUND OF THE INVENTION

1. Field of the Invention

This invention relates to a device comprising a self-retractable guide for centering and for vertically restraining pallets of less than full width in a transport vehicle, such as an airplane. In the preferred embodiment, the device presents only rolling surfaces to pallets.

2. Background of the Invention

It is common in transport vehicles, such as airplanes, to have a floor structure and rollers connected to the floor structure and defining a roller plane for rollingly supporting pallets above the floor structure such that the pallets may roll longitudinally. Vertical restraints, connected to the floor structure, hold the pallets down. The term "pallet" is used in this disclosure to include unit load devices including containers. A common pallet has a width of 125 inches, a length of 88 inches, a thickness of up to approximately five-eighths inches, and radiused corners of two inch minimum radius.

It is sometimes desirable to use pallets of different sizes. Commonly, full size and "half" size pallets are used. For example, a full pallet may have a width of 125 inches and a length of 88 inches so that side guides and side vertical restraints spaced 125 inches apart guide the moving pallet and vertically restrain the outer sides. The lateral sides are typically vertically restrained by lock heads that retract below the roller plane. A complementary "half" pallet may have a width of 61.5 or 62 inches and a length of 88 inches such that a small longitudinal space remains between half pallets. This space can be used for half pallet centerline guide and vertical restraint devices.

Some conventional guides and vertical restraints for smaller pallets are manually erected and retracted such that a person must do this when time is critical. Also, conventional guides and vertical restraints do not present a rolling surface to a pallet, rather the pallets scrape against the device. Consequently, with conventional devices, galling and considerable wear of both the pallet and the device occur.

Therefore, there has been a need for an improved guide and vertical restraint device for smaller pallets that is self erecting and retracting and that only presents rolling surfaces to a pallet.

SUMMARY OF THE INVENTION

According to the invention, a self-erecting guide for centering and for vertically restraining smaller than full width pallets in a transport vehicle, such as an airplane, having a floor structure and rollers connected to the floor structure and defining a roller plane for rollingly supporting pallets above the floor structure such that the pallets may roll longitudinally includes a plurality of rollers such that pallets contacting the guide contact a rotatable surface resulting in less galling and wear to the guide and pallets.

The guide generally includes a hinge assembly, fore and aft pivots, a frame, and erection springs.

The hinge assembly includes an middle pivot joining the inner ends of elongate arms. The outer ends of the arms are pivotally connected to a frame connected to the vehicle floor. The frame pivots move longitudinally in a frame channel and change the angle between the hinge arms. Compression springs bias the hinge assembly to an erect position wherein it forms a shallow inverted V in side view with the hinge axis at the apex such that a moving pallet contacting hinge assembly top forces the hinge assembly into a retracted position below the roller plane. The hinge assembly includes: overhanging rollers for vertically restraining pallets; side rollers for guiding pallets; and retraction rollers on top for rolling under a full width pallet such that the hinge assembly is forced to a retracted position below the roller plane.

Other features and many attendant advantages of the invention will become more apparent upon a reading of the following detailed description together with the drawings in which like reference numerals refer to like parts throughout.

DETAILED DESCRIPTION OF THE INVENTION

Figure 1:
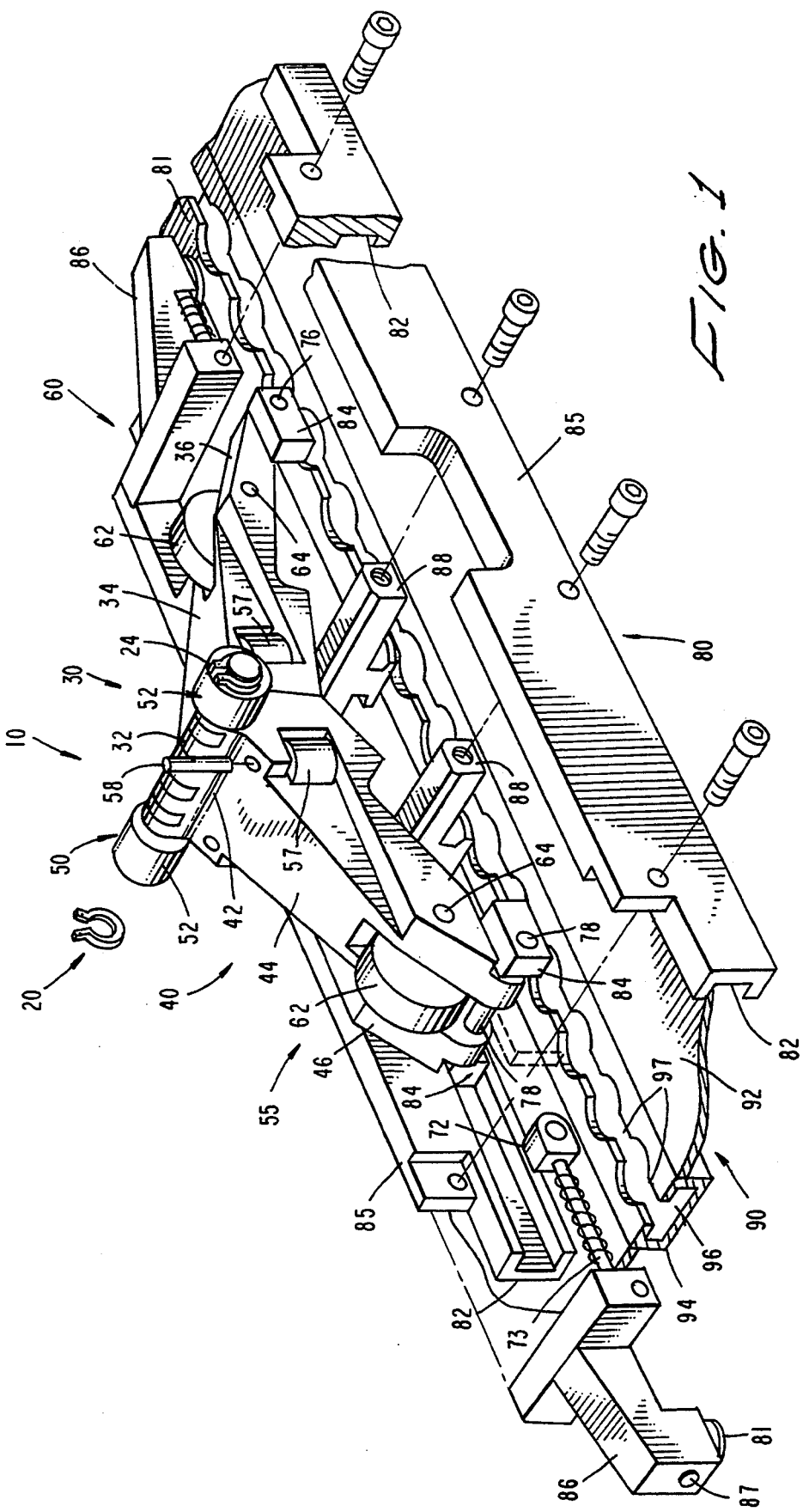
FIG. 1 is a partially-exploded perspective view of the preferred embodiment of the pallet guide and vertical restraint device of the present invention in an erect position and further shows a typical airplane floor structure.

FIG. 1 of the drawing is a partially-exploded perspective view of the preferred embodiment of the pallet guide and vertical restraint device, denoted generally as 10, of the present invention.

FIG. 1 further shows a typical airplane floor structure, denoted generally as 90 including a floor track 94. Typically, floor track 94 is incorporated into the structural floor 92 of an airplane and runs fore and aft, i.e. longitudinally. Floor track 94 includes access openings 96 between lips 97 for use in mounting devices, such as guide 10, to the floor structure 90.

Not shown in the figures is a plurality of rollers connected to floor structure 90 and defining a roller plane 99 (see FIG. 2) for rollingly supporting pallets 98 above the floor structure 90 such that the pallets 98 may roll back and forth longitudinally.

Since most aircraft pallets roll in the fore and aft or longitudinal direction, the terms "fore" and "aft" are used in the specification to define position of elements relative to one another and relative to direction of pallet movement, that is "fore" is defined to be in a first direction of pallet travel and "aft" is defined to be in the opposite direction of pallet travel.

Guide 10 generally includes a hinge assembly, denoted generally as 20, fore and aft pivots 76, 78, frame 80, and erection biasing means, such as spring assembly 70.

In the preferred embodiment shown, guide 10 is symmetrical fore and aft of middle pivot 24 and side to side of the longitudinal center line. Since the nature and location of any element may be known by the location and nature of its counterpart, not all elements need to be fully seen or described.

Figure 2:
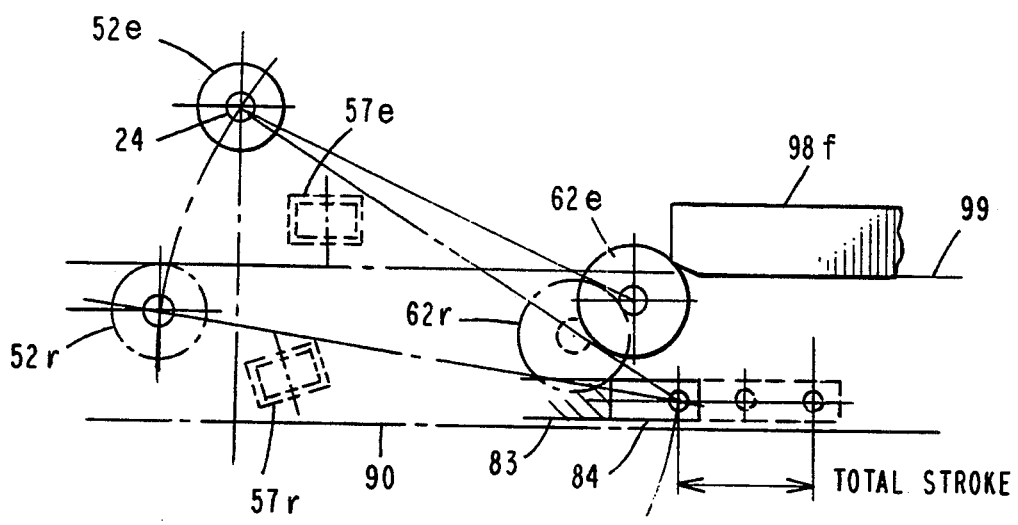
FIG. 2 is a schematic diagram illustrating in side view the erection and retraction movements of the device.

Frame 80 provides a means for connecting hinge assembly 20 to the floor structure such that fore and aft pivots 76,78 cannot move laterally or vertically. In the preferred embodiment, frame 80 includes a pair of side panels 85 connected on each end by end fittings 86 and connected in the middle by cross bars 88. Cross bars 88 and end fittings 86 include means, such as buttons 81, for connecting frame 80 to floor track 94 in a conventional manner. Frame 80 also includes fore and aft longitudinal guide means, such as a pair of fore and aft channels 82 containing slide blocks 84 connected to fore and aft pivots 76,78, for allowing longitudinal movement of fore and aft pivots 76,78 and for preventing lateral and vertical movement of fore and aft pivots 76,78. Each channel 82 has means, such as an end stop 83 (as seen in FIG. 2) on its inner end for confining horizontal movement of its slide block 84 and its pivot 76 or 78. However, channels 82 are sufficiently long to allow retraction of hinge assembly 20 by movement of a single pivot 76 or 78. Frame 80 is disposed below roller plane 99.

A fore pivot 76, having a lateral axis and mounted in slide block 84, pivotally connects the fore end of hinge assembly 20 to frame 80 below roller plane 99 and an aft pivot 78, having a lateral axis and mounted in slide block 84, pivotally connects the aft end of hinge assembly 20 to frame 80 below roller plane 99. Hinge assembly 20 is shown in FIG. 1 in the erect position. Hinge assembly 20 generally comprises a middle pivot 24, a fore arm, denoted generally as 30, an aft arm, denoted generally as 40, vertical restraint means, denoted generally as 50, side roller means, denoted generally as 55, and rotating means, denoted generally as 60. In the erect position shown, hinge assembly 20 forms a shallow inverted V in side view and has left and right sides and a generally upward facing top.

Middle pivot 24 has a lateral axis and hingedly connects inner end 32 of fore arm 24 to the inner end 42 of aft arm 40. Arms 30,40 mate in a knuckle hinge assembly having a bore housing middle pivot 24.

Fore arm 30 is connected to middle pivot 24 and projects fore therefrom. Fore arm 30 has left and right sides and a generally upward facing top and includes inner end 32 connected to middle pivot 24, outer end 36 disposed beneath roller plane 99 and connected to fore pivot 76 and pivotable about the fore pivot axis; and an elongate portion 34 between fore arm inner end 32 and fore arm outer end 36.

Aft arm 40 is connected to middle pivot 24 and projects aft therefrom. Aft arm 40 has left and right sides and a generally upward facing top and includes inner end 42 connected to middle pivot 24, outer end 46 disposed beneath roller plane 99 and connected to aft pivot 78 and pivotable about the aft pivot axis; and an elongate portion 44 between aft arm inner end 42 and aft arm outer end 46.

The inner ends 32,42 of arms 30,40 below middle pivot 24 bear against one another so as to limit the upward travel of hinge assembly 20 to a desired height.

Vertical restraint means 50, such as overhanging rollers 52 rotatingly mounted on extensions of middle pivot 24, overhangs half pallets 98h (see FIG. 3) on the roller plane 99 adjacent the hinge assembly sides when hinge assembly 20 is in the erect position and guides and vertically restrains half pallets 98h.

Side roller means 55 is connected to at least one of said arms 30,40 for rollingly guiding and laterally restraining the sides of half pallets 98h adjacent the sides of hinge assembly 20 when hinge assembly 20 is in the erect position. In the preferred embodiment, side roller means 55 includes four rollers 57, each rotatingly mounted, such as on an axle 58, in the side of each arm 30,40. Other side roller means 55 are contemplated and a single roller could be substituted for the double roller on each arm 30,40. Arms 30,40 taper in horizontal cross-section from inner end to outer end above the pallet roller plane.

Rotatable means 60, such as retractor wheels 62 mounted to each said arm, forms a rotating surface constituting at least part of the top of hinge assembly 20 for rolling under a full pallet 98f that encounters the hinge assembly top such that such pallet 98f does not encounter arms 30,40 and such that hinge assembly 20 is forced to a retracted position wherein all of hinge assembly 20 is disposed below the roller plane 99. Full pallet 98f contacts retractor wheel 62 at a point above its axis, axle 64, and generally perpendicular to the direction of arm rotation.

Spring assembly 70 biases hinge assembly 20 in the erect position. Spring assembly 70 includes a fore and an aft compression spring 71,72. Each spring 71,72 is mounted around a core pin 73 that has an outer end that travels in a bore 87 in end fitting 86 and an inner end attached to a spring guide 74 that is freely journaled on fore or aft pivot 76,78. In this manner, each compression spring 71,72 is compressed between frame end fitting 86 and its respective fore or aft pivot 76,78 to bias hinge assembly 20 in the erect position.

FIG. 2 is schematic diagram illustrating in side view the erection and retraction movements of the device 10. A portion of full pallet 98f is shown in position as it would be supported on the roller plane the moment it contacts erected fore retractor wheel 62e. The relative position of the roller of the fore part of the hinge assembly in the erected position are shown in solid lines and designated with and "e" for erect, including fore pivot 76e, fore retractor wheel 62e, overhanging roller 52e and side roller 57e. Fore pivot is mounted in slide block 84e in channel 82. Slide block 84e is biased by spring 71 against channel end stop 83. In reaction to full pallet 98f moving against retractor roller 62e, retractor roller 62e causes fore arm 40e to pivot about fore pivot 76e such that retractor roller 76e is depressed and rolls under full pallet 98f. At this point, the elements are in the retracted position completely beneath the roller plane as shown in phantom and as designated by "r", including retractor roller 76r, overhanging roller 52r, and side roller 57r. The aft pivot 78 will have moved aft in response to the rotation. As full pallet 98f rolls above guide 20, the biasing springs 71,72 will return middle pivot 24 to the centerline position under full pallet 98f. After full pallet 98f has passed, springs 71,72 return hinge assembly 20 to the erect position.

Although rotatable means 60 is illustrated as a single wheel, other configurations, such as a plurality of wheels, could be used to accomplish the same purpose, that is to provide a rotatable surface constituting at least part of the top of hinge assembly 20 such that full pallet 98f only encounters the rotatable surface and not a fixed part of arm 30,40. Thus, although in the preferred embodiment, overhanging rollers 52 are rotated to a position tangential to or below the roller plane when full pallet 98f rolls over retractor roller 62, they need not be so, and overhanging rollers 52 may be part of rotatable means 60 and encounter full pallet 98f and be forced under the roller plane thereby.

Figure 3:
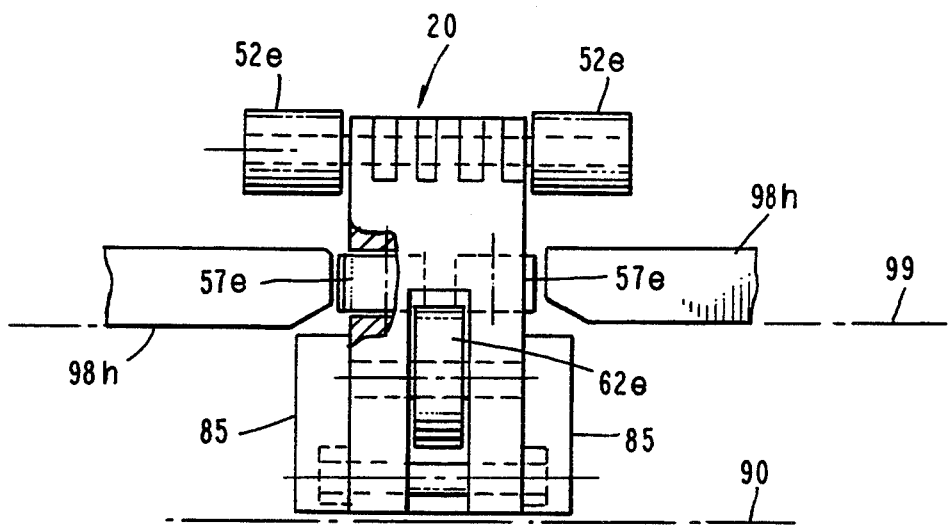
FIG. 3 is a diagrammatic end view of the guide in the erect position and guiding and restraining two half pallets.

FIG. 3 is a diagrammatic end view of the guide 10 in the erect position and guiding and restraining two half pallets 98h. Cut-away side edges of half pallets 98h are shown as supported on the roller plane. Side rollers 52 rollingly guide and laterally restrain half pallets 98h adjacent said sides of said hinge assembly 20. The relative positions of retractor roller 62, frame 80, and floor structure 90 are shown. There would typically be a one and one-quarter inch clearance between the roller plane and the bottom of overhanging rollers 52.

Figure 4:
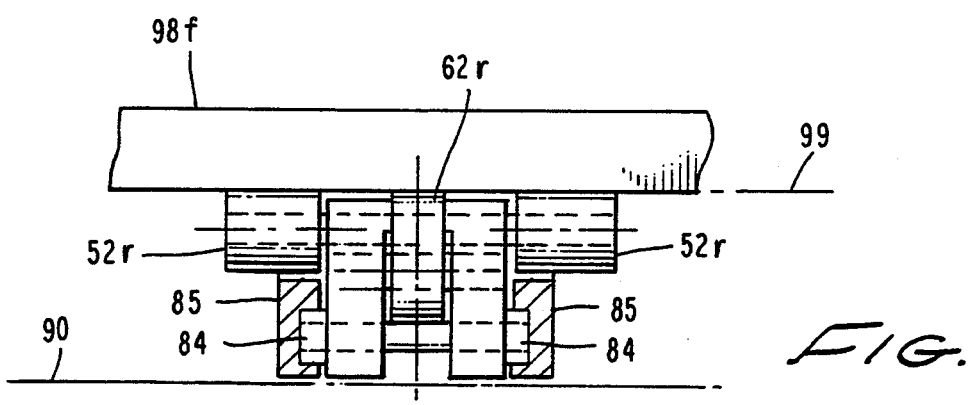
FIG. 4 is a diagrammatic end view of the guide in the depressed position and covered by a full pallet.

FIG. 4 is a diagrammatic end view similar to FIG. 3 but with guide 20 in the depressed position and covered by a full pallet 98f. All of guide 20 is below roller plane 99.

Although a particular embodiment of the invention has been illustrated and described, various changes may be made in the form, composition, construction, and arrangement of the parts without sacrificing any of its advantages. Therefore, it is to be understood that all matter herein is to be interpreted and illustrative and not in any limiting sense and it is intended to cover in the appended claims such modifications as come within the true spirit and scope of the invention.

In the following Claims, the terms "fore" and "aft" are for reference to define position of elements relative to one another and relative to direction of pallet movement and not in reference to fore and aft of the vehicle as a whole.

I claim:

1. In a transport vehicle having a floor structure and roller means connected to the floor structure and defining a roller plane for rollingly supporting pallets above the floor structure such that the pallets may roll longitudinally; a retractable guide for centering pallets; said guide comprising:
   a hinge assembly having a top and left and right sides; said hinge assembly comprising:
      a middle pivot hingedly connecting an inner end of a fore arm with an inner end of an aft arm; said middle pivot having a lateral axis;
      said fore arm connected to said middle pivot and projecting fore therefrom including:
         said inner end connected to said middle pivot;
         an outer end disposed beneath the roller plane; said fore arm being pivotable about its said outer end;
         an elongate portion between said fore arm inner end and said fore arm outer end;
         a top; and
         left and right sides;
      said aft arm connected to said middle pivot and projecting aft therefrom including:
         said inner end connected to said middle pivot;
         an outer end disposed beneath the roller plane; said aft arm being pivotable about its said outer end
         an elongate portion between said aft arm inner end and said aft arm outer end;
         a top; and
         left and right sides;
      at least one of said fore or aft arm outer ends being longitudinally horizontally moveable; and
      an overhang connected at or near said middle pivot; when said hinge assembly is in an erect position, said overhang being in a restraining position for overhanging and for vertically restraining a pallet on the roller plane adjacent a said side of said hinge assembly;
   a frame connecting said hinge assembly to the floor structure such that said hinge assembly cannot move laterally and such that, in the erect position, said overhang is restrained from upward movement; and
   biasing means for biasing said hinge assembly to the erect position wherein said hinge assembly forms a shallow inverted V in side view such that a moving pallet contacting said hinge assembly top forces said hinge assembly into a retracted position wherein all of said hinge assembly is disposed below the roller plane.

2. The guide of claim 1 further including:
   a fore pivot connected to said fore arm outer end and having a lateral axis below the roller plane; and wherein said frame further includes:
      fore longitudinal guide means connected to said fore pivot for allowing longitudinal movement of said fore pivot and for preventing lateral and vertical movement of said fore pivot.

3. The guide of claim 2 further including:
   an aft pivot connected to said aft arm outer end and having a lateral axis below the roller plane; and wherein said frame further includes:
   an aft pivot connecting means for preventing lateral and vertical movement of said aft pivot.

4. The guide of claim 1 further including:
   a fore pivot connected to said fore arm outer end and having a lateral axis below the roller plane; and wherein said frame further includes:
      fore longitudinal guide means connected to said fore pivot for allowing longitudinal movement of said fore pivot and for preventing lateral and vertical movement of said fore pivot; and wherein said biasing means includes:
   a compression spring acting between said frame and said fore arm outer end.

5. The guide of claim 1 wherein said overhang is an overhanging roller for overhanging, rollingly guiding and vertically restraining pallets on the roller plane adjacent said sides of said hinge assembly when said hinge assembly is in the erect position.

6. The guide of claim 1 further including:
   side roller means connected at least one of said arms for rollingly guiding and laterally restraining pallets adjacent said sides of said hinge assembly when said hinge assembly is in the erect position.

7. The guide of claim 1 further including:
   rotatable means mounted to each said arm including:
      a rotatable surface constituting at least part of said hinge assembly top; said rotatable surface for rolling under a pallet encountering said hinge assembly top such that such pallet does not encounter said arms and such that said hinge assembly is forced to a retracted position wherein all of said hinge assembly is disposed below the roller plane.

8. In a moving vehicle having a floor structure and roller means connected to the floor structure and defining a roller plane for rollingly supporting pallets above the floor structure such that the pallets may roll longitudinally; a retractable guide for centering pallets; said guide comprising:
   a hinge assembly having a top and left and right sides; said hinge assembly comprising:

a middle pivot hingedly connecting an inner end of a fore arm with an inner end of an aft arm; said middle pivot having a lateral axis;

said fore arm connected to said middle pivot and projecting fore therefrom including:
said inner end connected to said middle pivot;
an outer end disposed beneath the roller plane, connected to a fore pivot and pivotable about a fore pivot axis;
an elongate portion between said fore arm inner end and said fore arm outer end;
a top; and
left and right sides;

said aft arm connected to said middle pivot and projecting aft therefrom including:
said inner end connected to said middle pivot;
an outer end disposed beneath the roller plane; said aft arm being pivotable about its outer end;
an elongate portion between said aft arm inner end and said aft arm outer end;
a top; and
left and right sides; and overhang means connected at or near said middle pivot for overhanging and for vertically restraining a pallet on the roller plane adjacent a said left or right side of said hinge assembly when said hinge assembly is in an erect position;

a fore pivot connected to said fore arm outer end and having a lateral axis below the roller plane;

a frame connected to the floor structure including:
fore longitudinal guide means connected to said fore pivot for allowing longitudinal movement of said fore pivot and for preventing lateral and vertical movement of said fore pivot; and
biasing means for biasing said hinge assembly to an erect position wherein said hinge assembly forms a shallow inverted V in side view such that a moving pallet contacting said hinge assembly top forces said hinge assembly into a retracted position wherein all of said hinge assembly is disposed below the roller plane.

9. The guide of claim 8 further including:
an aft pivot connected to said aft arm outer end and having a lateral axis below the roller plane and about which said aft arm can pivot; and wherein said frame further includes:
aft pivot connecting means connected to said aft pivot for preventing lateral and vertical movement of said aft pivot.

10. The guide of claim 9 further including:
side roller means connected to at least one of said arms for rollingly guiding and laterally restraining pallets adjacent said sides of said hinge assembly when said hinge assembly is in the erect position.

11. The guide of claim 10 further including:
rotatable means mounted to each said arm including:
a rotatable surface constituting at least part of said hinge assembly top; said rotatable surface for rolling under a pallet encountering said hinge assembly top such that such pallet does not encounter said arms and such that said hinge assembly is forced to a retracted position wherein all of said hinge assembly is disposed below the roller plane.

12. The guide of claim 8 further including:
an aft pivot connected to said aft arm outer end and having a lateral axis below the roller plane and about which said aft arm can pivot; and wherein said frame further includes:
aft longitudinal guide means connected to said aft pivot for allowing longitudinal movement of said aft pivot and for preventing lateral and vertical movement of said aft pivot.

13. The guide of claim 8 wherein: said overhang means includes:
overhanging roller means for overhanging, rollingly guiding and vertically restraining pallets on the roller plane adjacent said sides of said hinge assembly when said hinge assembly is in the erect position.

14. The guide of claim 13 further including:
side roller means connected at least one of said arms for rollingly guiding and laterally restraining pallets adjacent said sides of said hinge assembly when said hinge assembly is in the erect position.

15. The guide of claim 14 further including:
rotatable means mounted to each said arm including:
a rotatable surface constituting at least part of said hinge assembly top; said rotatable surface for rolling under a pallet encountering said hinge assembly top such that such pallet does not encounter said arms and such that said hinge assembly is forced to a retracted position wherein all of said hinge assembly is disposed below the roller plane.

16. In a moving vehicle having a floor structure and roller means connected to the floor structure and defining a roller plane for rollingly supporting pallets above the floor structure such that the pallets may roll longitudinally; a device for centering and for vertically restraining pallets; said device comprising:
a hinge assembly having a top and left and right sides and having an erect position wherein said hinge assembly forms a shallow inverted V in side view; said hinge assembly comprising:
a middle pivot hingedly connecting an inner end of a fore arm with an inner end of an aft arm; said middle pivot having a lateral axis;
said fore arm connected to said middle pivot and projecting fore therefrom including:
a top;
left and right sides;
said inner end connected to said middle pivot;
an outer end disposed beneath the roller plane, connected to a fore pivot and pivotable about a fore pivot axis; and
an elongate portion between said fore arm inner end and said fore arm outer end;
said aft arm connected to said middle pivot and projecting aft therefrom including:
a top;
left and right sides;
said inner end connected to said middle pivot;
an outer end disposed beneath the roller plane, connected to an aft pivot and pivotable about an aft pivot axis; and
an elongate portion between said aft arm inner end and said aft arm outer end;
vertical restraint means connected at or near said middle pivot including:
overhanging roller means for overhanging, rollingly guiding and vertically restraining pallets on the roller plane adjacent said sides of said hinge assembly when said hinge assembly is in the erect position;

side roller means connected at least one of said arms for rollingly guiding and laterally restraining pallets adjacent said sides of said hinge assembly when said hinge assembly is in the erect position; and rotatable means mounted to each said arm including:
- a rotatable surface constituting at least part of said hinge assembly top; said rotatable surface for rolling under a pallet encountering said hinge assembly top such that such pallet does not encounter said arms and such that said hinge assembly is forced to a retracted position wherein all of said hinge assembly is disposed below the roller plane;

a fore pivot connected to said fore arm outer end and having a lateral axis below the roller plane;

an aft pivot connected to said aft arm outer end and having a lateral axis below the roller plane;

a frame connected to the floor structure including:
  fore longitudinal guide means connected to said fore pivot for allowing longitudinal movement of said fore pivot and for preventing lateral and vertical movement of said fore pivot; and
  aft pivot connecting means for preventing lateral and vertical movement of said aft pivot; and biasing means for biasing said hinge assembly to the erect position.

17. The device of claim 16 wherein:

said inner end of each said arm includes bearing surface means including a bearing surface; said arm bearing surfaces for bearing against one another in the erect position such that the angle below and between said arms cannot further diminish.

18. The device of claim 16 wherein:

said frame aft pivot connecting means allows longitudinal movement of said aft pivot; and said biasing means includes:
  a fore compression spring pushing aft on said fore arm outer end; and
  an aft compression spring pushing fore on said aft arm outer end.

* * * * *